US012384176B2

(12) United States Patent
Putin Burgos et al.

(10) Patent No.: US 12,384,176 B2
(45) Date of Patent: Aug. 12, 2025

(54) SHEET INLET AND OUTLET

(71) Applicant: Hewlett-Packard Development Company, L.P., Spring, TX (US)

(72) Inventors: Carlos Putin Burgos, Sant Cugat del Valles (ES); Carlos Clavel Marques, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 191 days.

(21) Appl. No.: 18/247,171

(22) PCT Filed: Sep. 30, 2020

(86) PCT No.: PCT/US2020/053455

§ 371 (c)(1),
(2) Date: Mar. 29, 2023

(87) PCT Pub. No.: WO2022/071937

PCT Pub. Date: Apr. 7, 2022

(65) Prior Publication Data

US 2023/0406014 A1 Dec. 21, 2023

(51) Int. Cl.

*B41J 13/00* (2006.01)
*B41J 11/00* (2006.01)
*B65H 3/66* (2006.01)

(52) U.S. Cl.

CPC ............ *B41J 13/0036* (2013.01); *B65H 3/66* (2013.01); *B41J 11/0005* (2013.01); *B65H 2301/51256* (2013.01); *B65H 2404/611* (2013.01); *B65H 2801/39* (2013.01)

(58) Field of Classification Search

CPC .. B41J 13/0036; B41J 11/0005; B41J 13/103; B65H 3/66; B65H 2301/51256; B65H 2404/611; B65H 5/38; B65H 2301/3122; B65H 2402/54; B65H 2404/72; B65H 2404/743; B65H 2405/115;

(Continued)

(56) References Cited

U.S. PATENT DOCUMENTS

| | | | | |
|---|---|---|---|---|
| 3,468,605 A * | 9/1969 | Martin | .................. | G03G 15/28 399/385 |
| 5,913,511 A | 6/1999 | Miyauchi | | |
| 7,591,456 B2 | 9/2009 | Connors et al. | | |

(Continued)

FOREIGN PATENT DOCUMENTS

| | | |
|---|---|---|
| CN | 101850911 A | 10/2010 |
| CN | 202265228 U | 6/2012 |

(Continued)

*Primary Examiner* — Yaovi M Ameh

(74) *Attorney, Agent, or Firm* — Jordan IP Law, LLC

(57) ABSTRACT

Examples include a sheet transport apparatus comprising a sheet inlet facing a specific side of the apparatus. The sheet transport apparatus also comprises a sheet outlet facing the specific side of the apparatus and located below the sheet inlet, the sheet outlet comprising a ceiling between the sheet outlet and the sheet inlet. The sheet transport apparatus further comprises a sheet driving mechanism configured for driving a sheet of media on a media path from the sheet inlet to the sheet outlet, and a flexible and resilient device connected to the ceiling and partially obstructing the sheet outlet.

14 Claims, 6 Drawing Sheets

(58) Field of Classification Search
CPC .......... B65H 2405/141; B65H 2801/06; B65H 2801/39; B65H 29/12; B65H 29/52; G03G 15/652
See application file for complete search history.

(56) References Cited

U.S. PATENT DOCUMENTS

| | | | |
|---|---|---|---|
| 8,480,078 B2 | 7/2013 | Kubota et al. | |
| 8,820,735 B2 | 9/2014 | Ishikawa et al. | |
| 9,738,097 B2 | 8/2017 | Nolting et al. | |
| 2003/0007823 A1 | 1/2003 | Tsuchiya et al. | |
| 2008/0308998 A1 | 12/2008 | Dobashi et al. | |
| 2009/0267284 A1 | 10/2009 | Okuda et al. | |
| 2010/0244362 A1 | 9/2010 | Kawamata et al. | |
| 2010/0247183 A1* | 9/2010 | Haseba | G03G 15/2064 399/329 |
| 2011/0211210 A1 | 9/2011 | Niihara et al. | |
| 2012/0193867 A1 | 8/2012 | Nagao | |
| 2012/0205855 A1 | 8/2012 | Cook | |
| 2017/0305713 A1* | 10/2017 | Ino | G03G 15/6558 |
| 2019/0135564 A1 | 5/2019 | Machida | |

FOREIGN PATENT DOCUMENTS

| | | | | |
|---|---|---|---|---|
| JP | 2002152463 A | * | 5/2002 | H04N 1/00 |
| JP | 2004177836 A | * | 6/2004 | G03G 15/00 |
| JP | 2010137964 A | * | 6/2010 | B65H 31/30 |
| JP | 2011046519 A | * | 3/2011 | B65H 5/06 |

* cited by examiner

SHEET INLET AND OUTLET

BACKGROUND

This disclosure generally relates to the handling of sheets. Due to the generally two dimensional nature of sheets, sheets are widely used as a support to share information in the written or graphical form. This two dimensional nature of sheets also tends to render them flexible, such that they may be bent during transportation within sheet processing devices such as scanners, printers, copiers, stapling devices, folding devices, bookbinding devices or packaging devices for example. This flexibility of sheets permits designing a variety of sheet transportation paths, or media path, within such sheet processing devices, permitting the processing of such sheets between an inlet and an outlet by sheet transport apparatuses.

DETAILED DESCRIPTION

While the flexibility of sheets does provide significant design freedom as to media path within a sheet transport apparatus, it was realized that flexibility also may be a source of malfunction, in particular in cases where a sheet inlet and a sheet outlet are in proximity to each other. In some cases indeed, a processed sheet exiting from a sheet outlet of a sheet transport apparatus may follow an unexpected trajectory and get unexpectedly reinserted into a sheet inlet of the same sheet transport apparatus, leading to issues such as multiple processing of a same sheet or sheet portion, sometimes associated to a lack of processing of another sheet or sheet portion which happens to be covered by the reinserted sheet or sheet portion, or even to jamming of the sheet transport apparatus. Avoiding or reducing the occurrence of such malfunctions in a sheet transport apparatus forms the foundation of the present disclosure as will be described below.

Figure 1A:
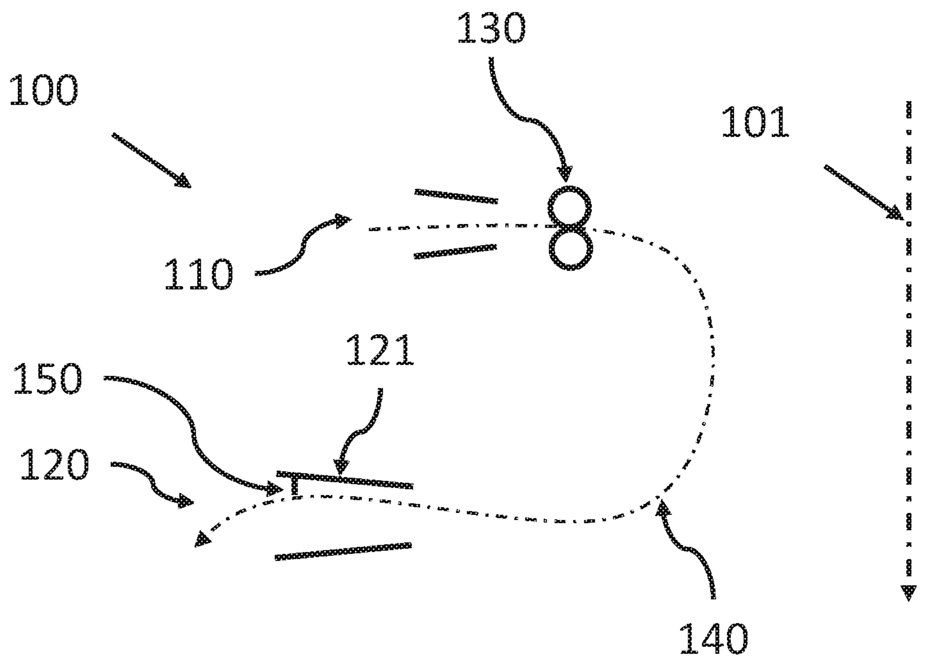
FIG. 1A-B illustrate a first example sheet transport apparatus.
Figure 1B:
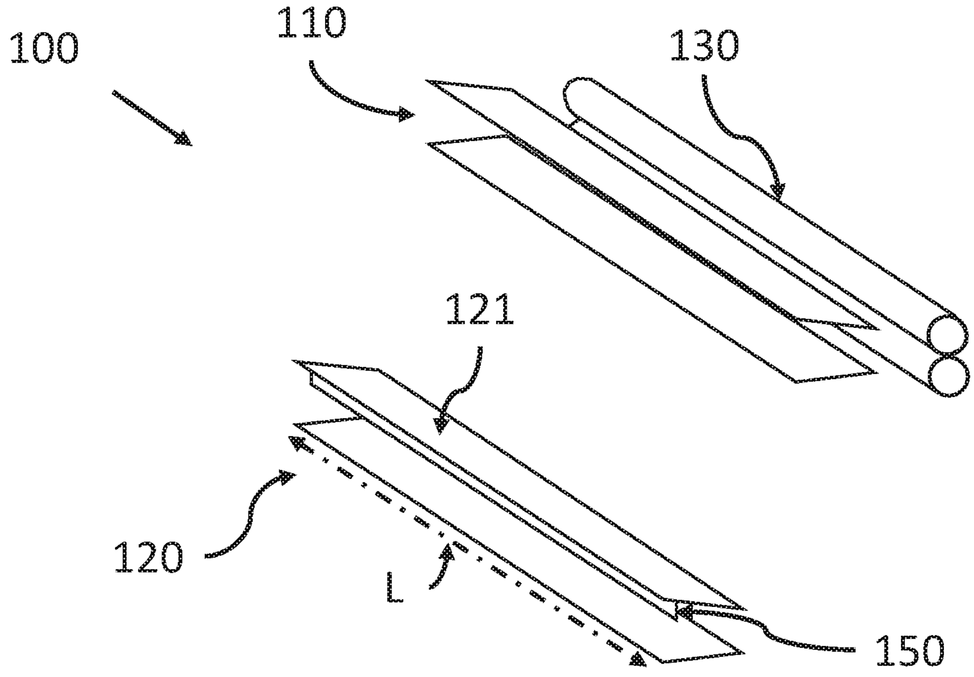

FIG. 1A illustrates a cross section of an example sheet transport apparatus 100 represented in FIG. 1B. A sheet transport apparatus should be understood as an apparatus which permits transporting sheets, in particular transporting sheets along a direction tangential in a given point of the sheet to a plane corresponding to a surface of the sheet at this given point. Such sheet transport apparatus may be self-standing, or may be comprised in a sheet processing device such as a scanner, printer, copier, stapling device, folding device, bookbinding device or packaging device for example. A sheet transport apparatus may comprise a housing or a sheet transport apparatus enclosure, or may be integrated in a sheet processing device without specific sheet transport apparatus enclosure.

Apparatus 100 comprises a sheet inlet 110. A sheet inlet should be understood as an elongated mechanical assembly configured to guide a sheet in a specific direction. A length defined by an elongated shape would be in a direction generally horizontal in reference to a direction of gravity 101. In some examples, a sheet inlet may comprise a mechanical guiding element such as a tray or a platen. In some examples, the sheet inlet has a generally funnel shape as illustrated for example on FIG. 1A-B. A sheet transported by the apparatus 100 would enter the apparatus 100 on a first end of the sheet inlet and be guided further into the apparatus through a second end of the sheet inlet. The sheet inlet faces a specific side of the apparatus. The specific side of the apparatus should be understood as a side facing a first end of the sheet inlet, in other words a side from which a sheet may be fed into the sheet inlet. The specific side may be defined as a sheet feeding side of the apparatus.

Apparatus 100 comprises a sheet outlet 120. A sheet outlet should be understood as an elongated mechanical assembly configured to guide a sheet in a specific direction. In some examples, a sheet outlet may comprise a mechanical guiding element such as a tray or a platen. In some examples, the sheet outlet has a generally funnel shape as illustrated for example on FIG. 1A-B. A sheet transported by the apparatus 100 would exit the apparatus 100 through a first end of the sheet outlet and be guided further out of the apparatus through a second end of the sheet outlet. The sheet inlet faces the specific side of the apparatus. The specific side of the apparatus should be understood as a side facing both the first end of the sheet inlet, and the second end of the sheet outlet. In other words, the specific side should be understood as a side from which a sheet may be fed into the sheet inlet and from which the sheet exits the sheet outlet. The specific side may be defined as a sheet feeding side and sheet exiting side of the apparatus.

As illustrated in apparatus 100, the sheet outlet 120 is located below the sheet inlet 110. It should be understood that sheets transported by apparatus 100 are submitted to gravity. In this respect, when apparatus 100 is in a functional position, the sheet outlet 120 is located below the sheet inlet 110 as far as the direction of gravity 101 is concerned. Such a location may contribute, to some degree, to the transporting of the sheet between the sheet inlet and the sheet outlet through the apparatus 100. It should be understood that while the sheet outlet 120 is located below the sheet inlet 110, the sheet outlet may 120 not be located directly below the sheet inlet. The sheet outlet 120 may be located below the sheet inlet in that the sheet outlet may be located at a lower altitude than the sheet inlet. In some examples, the sheet inlet and the sheet outlet are separated by a height of less than 20 cm. In some examples, the sheet inlet and the sheet outlet are separated by a height of less than 15 cm. In some examples, the sheet inlet and the sheet outlet are separated by a height of less than 12 cm. In some examples, the sheet inlet and the sheet outlet are separated by a height of more than 7 cm. In some examples, the sheet inlet and the sheet outlet are separated by a height of more than 5 cm. Such height separating the inlet and outlet may be defined as a height along the direction of gravity when the apparatus is in an operating position, such height being measured between a floor level of the inlet and a ceiling level of the outlet, thereby corresponding to a distance which a leading edge of a sheet would have to cross upwards in order to get accidentally re-ingested from the sheet outlet to the sheet inlet. In some examples, a space separating such sheet inlet floor and the sheet outlet ceiling is unencumbered, thereby permitting reducing an overall footprint of the apparatus.

As illustrated in FIG. 1A-B, the sheet outlet comprises a ceiling 121. The ceiling should be understood as a mechanical element participating in guiding a sheet passing through the sheet outlet, the ceiling being defining an upper limit of the sheet outlet, taking the direction of gravity as a reference. The ceiling may be generally elongated and smooth in order to guide a sheet while avoiding entrapment of the sheet against the ceiling. A length L defined by an elongated shape would be in a direction generally horizontal in reference to a direction of gravity 101. The ceiling 121 is located between the sheet outlet and the sheet inlet and thereby defines a boundary between the sheet inlet and the sheet outlet.

As illustrated in FIG. 1A-B, apparatus 100 comprises a sheet driving mechanism 130. A sheet driving mechanism should be understood as a mechanism configured to advance a sheet from the sheet inlet to the sheet outlet. A sheet driving mechanism may be configured to apply a force onto the sheet, the force comprising a component in a plane defined by the sheet at the point of application of the force. Such force may for example be applied by friction. In some examples, the mechanism may comprise one or more of a roller, driven roller, freewheeling roller, a ball, a vacuum pump or a belt. The sheet driving mechanism 130 is configured for driving a sheet of media on a media path 140 from the sheet inlet to the sheet outlet. In some examples, the sheet driving mechanism is configured to advance the sheet at a speed of at least 0.05 m/s between the sheet inlet and the sheet outlet. In some examples, the sheet driving mechanism is configured to advance the sheet at a speed of more than 0.25 m/s between the sheet inlet and the sheet outlet.

A sheet of media may for example be a sheet of printing media. A sheet of media may comprise cellulose based fibers. A sheet of media may be made of paper. A sheet of media may be a laminate. A sheet of media may be a textile sheet of media. The apparatus 100 is configured to transport such a sheet of media in so far as such a sheet of media is flexible, meaning that such sheet of media may be bend into a non planar shape without breaking. Such flexibility indeed permits transporting the sheet of media along the media path defined by the apparatus 100, whereby such media path may comprise one or more curved media path sections.

A media path should be understood as a trajectory or path followed by a media or substrate, such as a continuous or cut sheet, being displaced from a storage location such as, for example, a media roll or a media tray, towards a processing area. A media path may be defined by a number of media handling elements such as trays, spindles, guiding structures or platen, vacuum pumps or vacuum platen, or rollers including for example pinch rollers, tire rollers or freewheeling rollers. In some examples, the media path has a media path length of more than 350 mm. In some examples, the media path has a media path length of more than 400 mm. In some examples, the media path has a media path length of more than 450 mm. Such media path length may be measured between the sheet inlet and the sheet outlet. In some cases, a longer media path increasing the likelihood of sheet curling, rendering the configuration according to this disclosure particularly suitable.

As illustrated in FIG. 1A-B, apparatus 100 comprises a flexible and resilient device 150 connected to the ceiling and partially obstructing the sheet outlet. Due to the device 150 partially obstructing the sheet outlet and being connected to the ceiling, a sheet exiting the sheet outlet and having a tendency to bend upwards to enter in contact with the ceiling may enter in contact with the device 150. In case of entering in contact with the device, due to the device 150 being flexible, the sheet will displace or bend the device 150 to some degree. Flexibility permits avoiding or reducing a risk of entrapment of the sheet, which may otherwise introduce a jamming risk. Such displacement or bending of the device 150 will produce a reaction force from the device 150 onto the sheet, due to the resilience of such device 150 (the device 150 is indeed not only flexible, but resilient). This reaction force will have as a consequence directing the sheet away from the ceiling, thereby directing the sheet away from the sheet inlet, thereby avoiding that the sheet be re-ingested into the sheet inlet. Flexibility should be understood as the capacity to be displaced or bend without breaking. In some examples, the device 150 is flexible in that device flexible bends or is displaced by application of a force of less than 1 N. Resiliency should be understood as the capacity to return to an original position or location when application of such a force is removed.

Figure 1C:
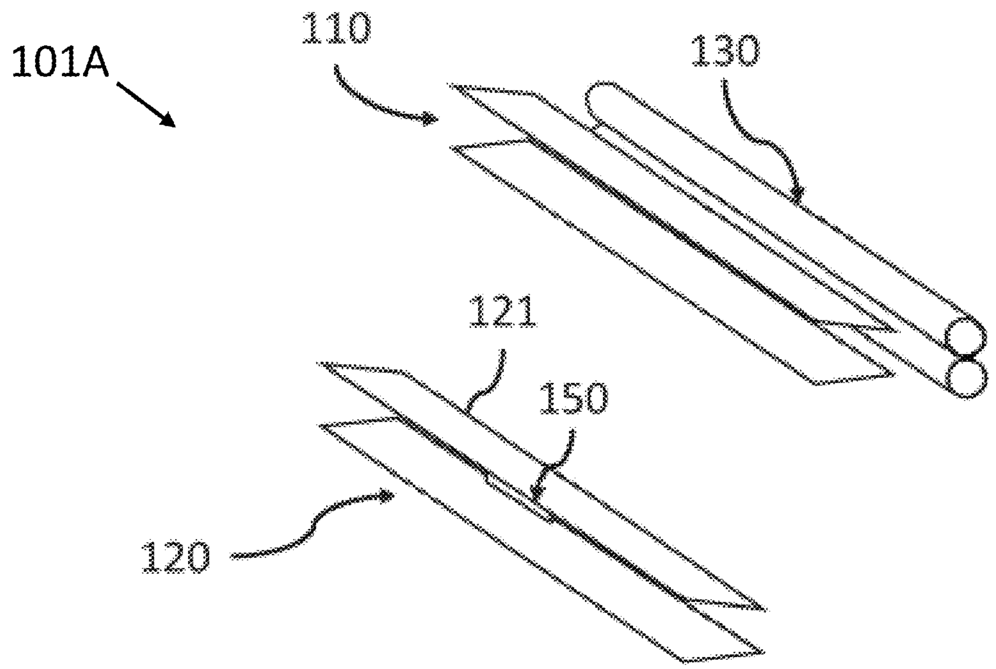
FIG. 1C illustrates a second example sheet transport apparatus.
Figure 1D:
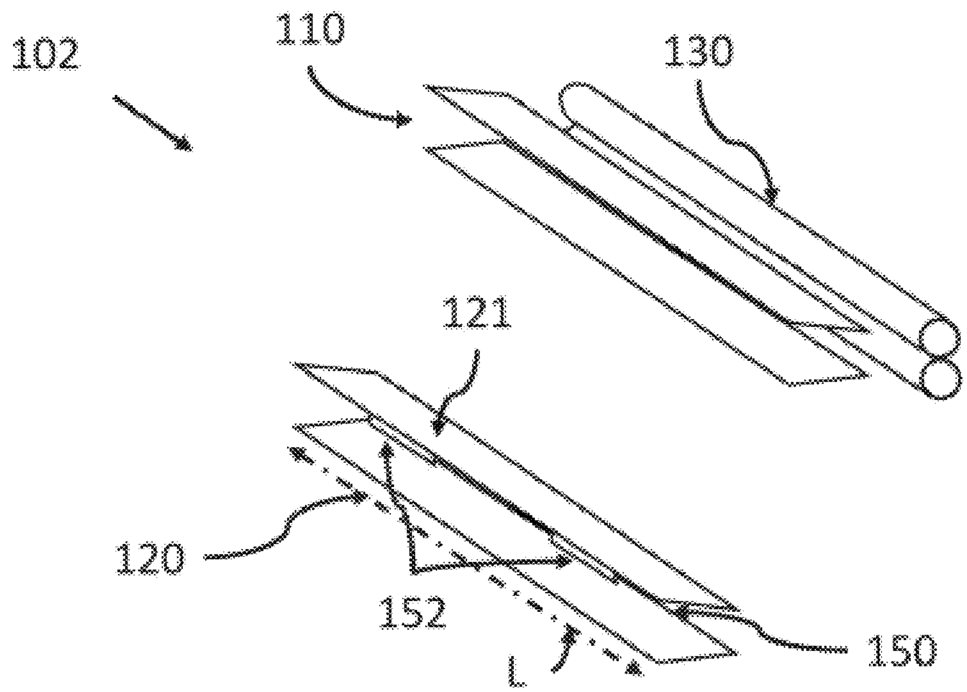
FIG. 1D illustrates a third example sheet transport apparatus.

The flexible and resilient device may take a variety of forms and shapes. In some examples, the flexible and resilient device may be a thermoplastic resin lip attached to the ceiling of the sheet outlet. In some examples, the flexible and resilient device comprises distinct elements, whereby one or more elements provide flexibility and resilience, while one or more other elements provide a surface of contact with a sheet. In some examples, the flexible and resilient device extends from a proximal end attached to the ceiling down to a distal end, the flexible and resilient device having a device length between the its proximal and distal ends. In some examples, the device length is of at least 1 mm. In some examples, the device length is of at least 2 mm. In some examples, the device length is of at least 3 mm. In some examples, the device length is of length is of less than 15 mm. In some examples, the device length is of less than mm. In some examples, the flexible and resilient device 151 is located in a central area of the length of the sheet outlet as illustrated for example on FIG. 1C illustrating example sheet transport apparatus 101A. Apparatus 101A has a cross section corresponding to the cross section of FIG. 1A in a plane intersecting flexible and resilient device 151 (in the different figures, the same reference numbers may be used for elements which are the same or equivalent). In some examples, the flexible and resilient device 150 spans the entire length L of the sheet outlet, as illustrated for example on FIG. 1B. In some examples, a plurality of flexible and resilient devices 152 is provided along a length of the sheet outlet, the length of the sheet outlet being in a substantially horizontal direction and in a plane corresponding to the sheet, as illustrated for example on FIG. 1D illustrating example sheet transport apparatus 102. In some examples, flexible and resilient devices 152 of the plurality are aligned. In some examples, flexible and resilient devices 152 of the plurality are evenly spread across the length L of the sheet outlet.

Figure 2A:
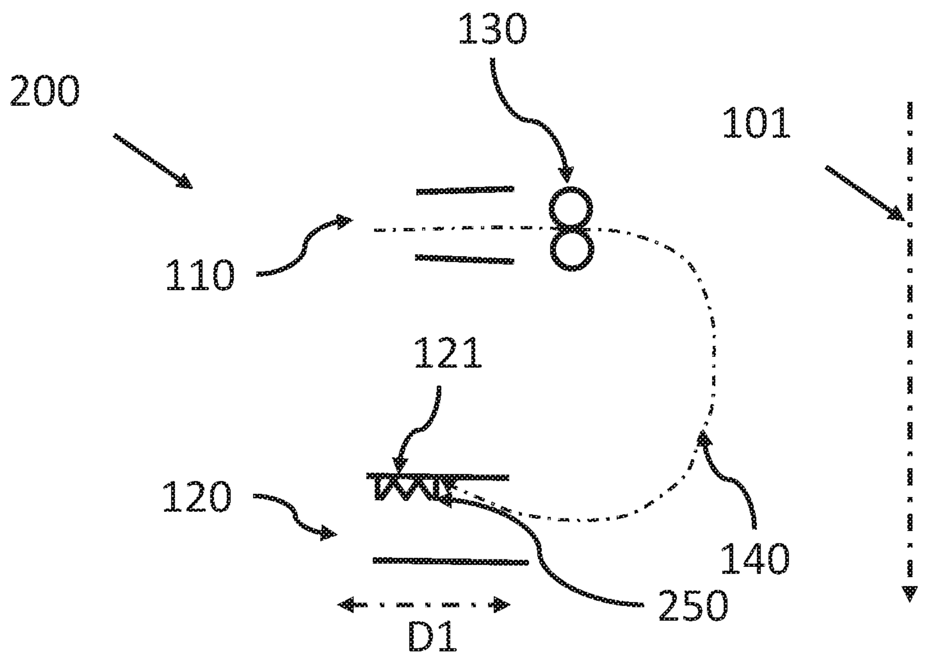
FIG. 2A-B illustrate a fourth example sheet transport apparatus.
Figure 2B:
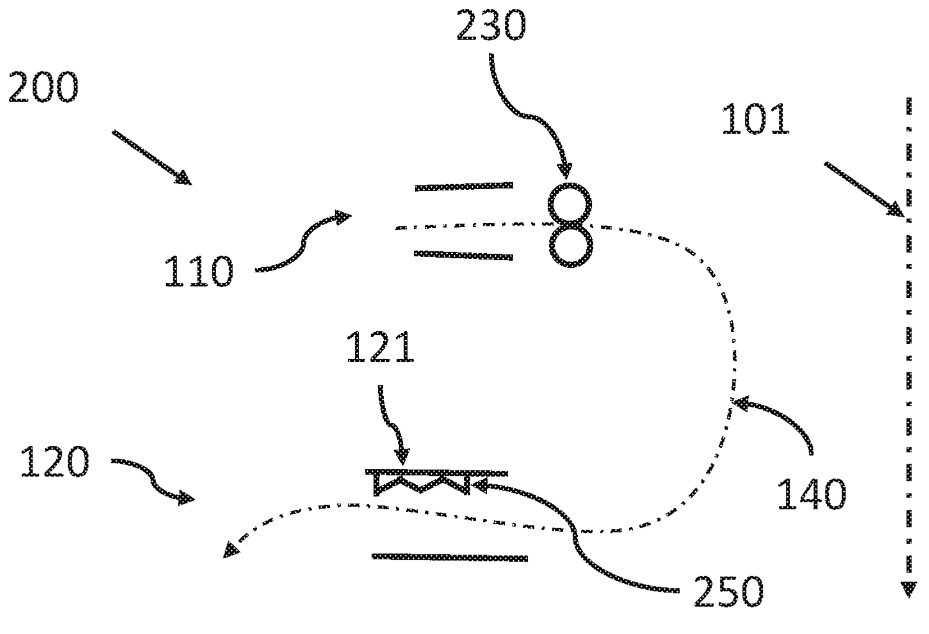

FIGS. 2A and 2B illustrate a further example sheet transport apparatus 200 comprising elements similar to the elements described for example for apparatus 100. As illustrated in FIGS. 2A-B, the flexible and resilient device 250 of apparatus 200 comprises a spring. The spring permits obtaining the desired flexibility and resilience. As illustrated in FIG. 2A, the device may be displaced by a leading edge of a sheet following media path 140, the spring absorbing a curling force at the leading edge, until the sheet passes through the sheet outlet as illustrated in FIG. 2B, whereby the curling force has been compensated by the reaction force of the spring, the sheet passing through the outlet without risk to raise in a counter gravity direction to be re-ingested at the sheet inlet.

It should be understood that the relative dimensions of the flexible and resilient device as represented on the Figures are adapted to facilitate the understanding and readability of the Figures and may not necessarily correspond actual relative example dimensions of the flexible and resilient device compared to dimensions of the sheet outlet. In some examples, the flexible and resilient device obstructs an area covering less than 5% of a cross section of the sheet outlet. Such cross section of the sheet outlet should be understood as the surface area of the passage through the sheet outlet along a plane normal to a direction of media path at the sheet outlet, the plane intersecting the flexible and resilient device. In some examples, the flexible and resilient device obstructs an area covering less than 1% of a cross section of the sheet outlet. In some examples, the flexible and resilient device obstructs an area covering less than 0.1% of a cross section of the sheet outlet. In fact, the positioning of the flexible and resilient device as being connected to the ceiling permits reducing a risk of re-ingestion without obstructing the sheet outlet in a significant manner, thereby avoiding introducing permanent sheet damage risks or jamming risks at the sheet outlet. In some examples, the flexible and resilient device obstructs an area covering more than 5 $cm^2$. In some examples, the flexible and resilient device obstructs an area covering more than 1 $cm^2$. In some examples, the flexible and resilient device obstructs an area covering more than 0.1 $cm^2$. In some examples, the flexible and resilient device obstructs an area covering less than 10 $cm^2$. In some examples, the flexible and resilient device obstructs an area covering less than 1 $cm^2$.

A spring should be understood in this description as a mechanical element which may elastically store mechanical energy. Example springs comprise tension or extension springs, compression springs or torsion springs. The use of a spring may facilitate rendering the device flexible and resilient, whereby the device, when entered in contact by a sheet, may get flexibly displaced while storing mechanical energy from, for example, curling of the sheet, the sheet progressively being shaped by reaction with the contact with the device, the spring resiliently returning to an original position when the sheet has taken a desired trajectory.

In some examples, the spring has a spring rate of less than 1 N/mm. In some examples, the spring has a spring rate of less than 0.90 N/mm. In some examples, the spring has a spring rate of less than 0.80 N/mm. In some examples, the spring has a spring rate of less than 0.75 N/mm. Having a relatively reduced spring rate may reduce a risk of permanently damaging a sheet due to a relative lack of flexibility of the device.

As illustrated in FIGS. 2A and 2B, the spring may be an an extension spring having a stretching axis along a direction D1 aligned with a direction of the media path at the sheet outlet. In some examples, the alignment corresponds to an alignment angle between the stretching axis and the media path direction at the outlet comprised between +20 and −20 degrees. In some examples, the alignment corresponds to an alignment angle between the stretching axis and the media path direction at the outlet comprised between +15 and −15 degrees. In some examples, the alignment corresponds to an alignment angle between the stretching axis and the media path direction at the outlet comprised between +10 and −10 degrees. In some examples, the alignment corresponds to an alignment angle between the stretching axis and the media path direction at the outlet comprised between +5 and −5 degrees. Such an alignment facilitates the storing of energy by the spring as a sheet advances while in contact and pushing against the flexible and resilient device.

In some examples, each of the sheet inlet and the sheet outlet span at least 250 mm along a direction perpendicular to both a direction of gravity and a direction aligned with a direction of the media path at the sheet inlet and at the sheet outlet, respectively.
Such a dimension may for example in some cases apply to apparatuses such as apparatus 100, 101A, 102 or 200, whereby length L would be of more than 250 mm. Such apparatuses would be configured to handle sheets having dimensions in excess of a standard A4 dimension of in excess of a standard B5 dimension, in other words large format sheets. Due to their size, large format sheets tend to be stored in the form of a roll, or as a roll itself. Due to such storage, such sheets tend to be submitted to curling, in that they have a tendency to deviate from a straight trajectory when processed through a media path, thereby introducing a heightened risk or re-ingestion. The example flexible and resilient device hereby described is thereby particularly suited to being implemented in situation where the sheet inlet and the sheet outlet span at least 250 mm along a direction perpendicular to both a direction of gravity and a direction aligned with a direction of the media path at the sheet inlet and at the sheet outlet, respectively. In some examples, the sheet inlet and the sheet outlet span at least 300 mm along a direction perpendicular to both a direction of gravity and a direction aligned with a direction of the media path at the sheet inlet and at the sheet outlet, respectively. In some examples, the sheet inlet and the sheet outlet span at least 400 mm along a direction perpendicular to both a direction of gravity and a direction aligned with a direction of the media path at the sheet inlet and at the sheet outlet, respectively. In some examples, the sheet inlet and the sheet outlet span at least 500 mm along a direction perpendicular to both a direction of gravity and a direction aligned with a direction of the media path at the sheet inlet and at the sheet outlet, respectively. In some examples, the sheet inlet and the sheet outlet span at least 700 mm along a direction perpendicular to both a direction of gravity and a direction aligned with a direction of the media path at the sheet inlet and at the sheet outlet, respectively. In some examples, the sheet inlet and the sheet outlet span at least 1000 mm along a direction perpendicular to both a direction of gravity and a direction aligned with a direction of the media path at the sheet inlet and at the sheet outlet, respectively.

Figure 3:
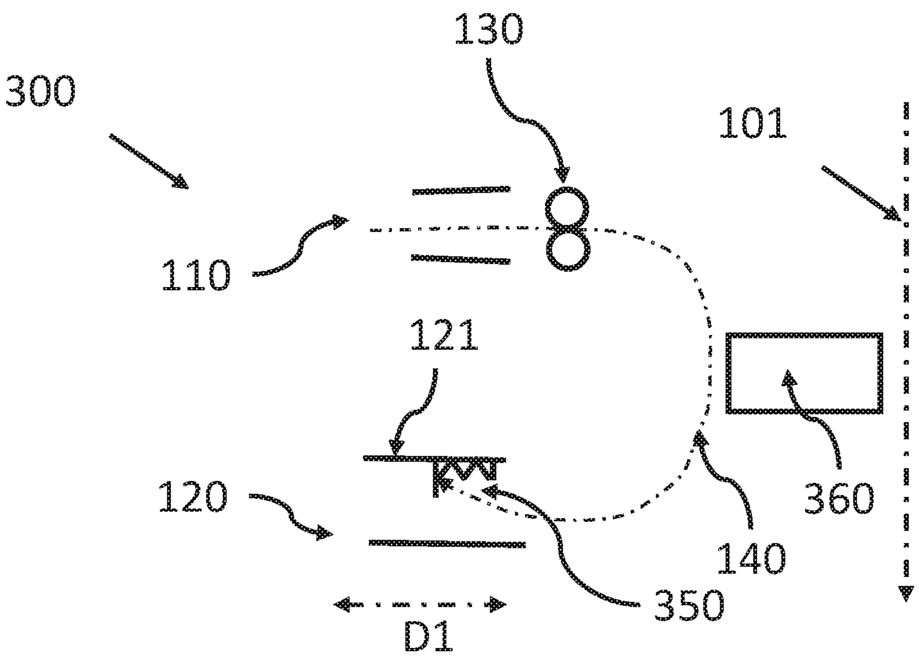
FIG. 3 illustrates a fifth example sheet transport apparatus.

FIG. 3 illustrates a further example sheet transport apparatus 300 comprising elements similar to the elements described for example for apparatus 200 and numbered using the same reference numerals. As illustrated in FIG. 3, the sheet transport apparatus comprises a scanner 360 located along the media path 140. Scanner 60 is configured to scan a side of a sheet following media path 140 between the sheet inlet and the sheet outlet to produce a digital representation of a graphical representation on the side of the sheet scanned by the scanner. Such scanning is likely to fail if a sheet exiting the apparatus through the sheet outlet is re inserted by mistake into the sheet inlet, for example due to curling of the sheet. Such risk of scanning failure is reduced or suppressed by the effect of the flexible and resilient device according to this disclosure, which is thereby particularly suitable for such a scanner configuration. In example sheet transport apparatus 300, the flexible and resilient device 350 comprises an extension spring, a curling sheet exerting a force onto the flexible and resilient device tending to extend the spring.

Figure 4:
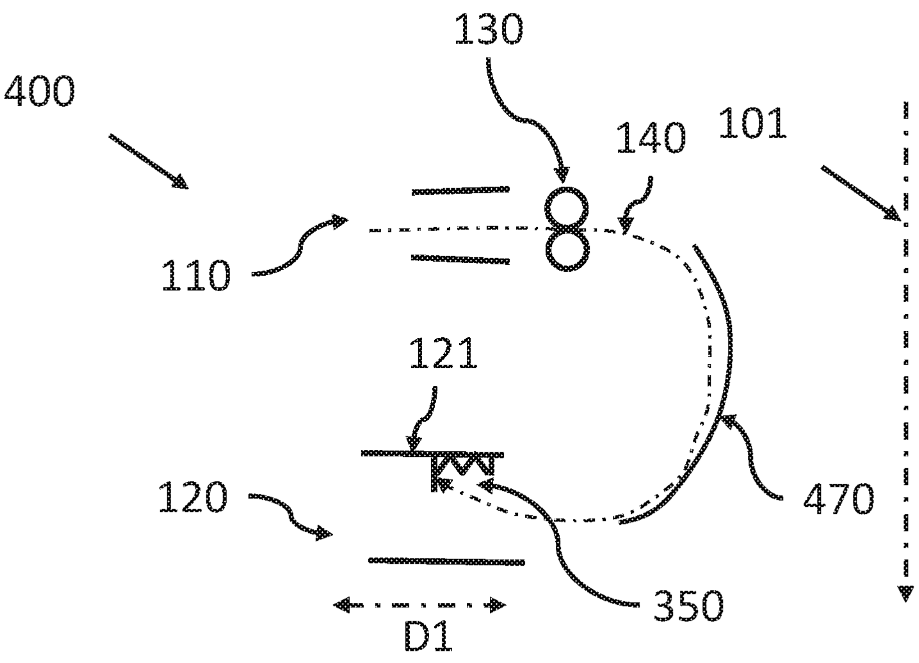
FIG. 4 illustrates a sixth example sheet transport apparatus.

FIG. 4 illustrates a further example sheet transport apparatus 400 comprising elements similar to the elements described for example for apparatus 200 and numbered using the same reference numerals. As illustrated in FIG. 4, the sheet transport apparatus comprises a guiding element 470 in the media path 140, whereby the guiding element forms a U turn between the sheet inlet and the sheet outlet. While a single guiding element is represented in example apparatus 400, additional guiding elements may be provided, for example opposed U turn guiding elements forming an S shaped media path. Such guiding elements should be understood as mechanical components having a smooth surface configured to direct the sheet in a desired direction along the media path. The presence of such guiding elements, while permitting structuring a desired media path, may promote or contribute to generating curling, thereby increasing a risk of a leading edge of a sheet being accidentally re-entering the sheet inlet after exiting the sheet outlet. Such risk of sheet transportation failure is reduced or suppressed by the effect of the flexible and resilient device according to this disclosure, which is thereby particularly suitable for such a configuration comprising a guiding element.

Figure 5A:
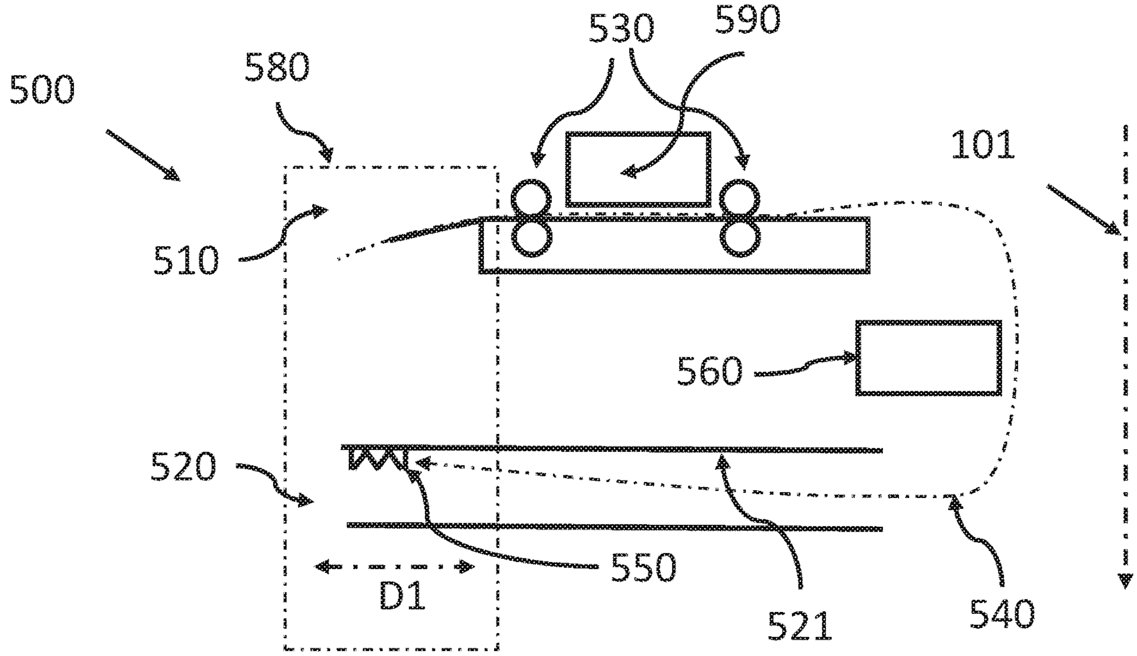
FIG. 5A illustrates a first example printer.

FIG. 5A illustrates an example printer 500. A printer should be understood in this disclosure as a device configured to print a graphical representation on a sheet like media using for example an ink, a toner or a fluid marking material. Example printers include thermal inkjet printers, piezo inkjet printers, laser printers or liquid electrophotographic printers. Example printer 500 comprises a scanner 560. Such a printer comprising a scanner may be named an "all in one" printer, implying that such a printer is configured to operate both as a scanner and as a printer. Example printer 500 comprises a sheet inlet for the scanner, the sheet inlet being located on a first side 580 of the printer 500. Printer 500 comprises a sheet outlet 520 for the scanner, the sheet outlet located on the first side 580 of the printer. Located both the sheet inlet and the sheet outlet on a same side permits providing access to a user on a same side of the printer for both inlet and outlet, thereby permitting for example locating the printer against a wall, the wall facing a side opposite the first side. This configuration is particularly of interest in the case of relatively large printers. The sheet inlet 510 is located above the sheet outlet 520. Such relative location permits benefiting from the force of gravity along the direction of gravity 101 when guiding a sheet on a media path between the inlet and outlet. The printer 500 comprises a sheet driving mechanism, which may for example comprise one or more rollers 530, such sheet driving mechanism permitting driving a sheet from the inlet to the outlet. The printer 500 further comprises a spring loaded member 550 attached to an upper wall 521 of the sheet outlet, whereby the spring loaded member permits redirecting a sheet exiting through the sheet outlet which would otherwise risk getting re-ingested through the sheet inlet, which is on the same side and above the sheet outlet.

As represented in FIG. 5A, printer 500 may in some cases comprise a print head or print engine 590 which would permit printing on a side of a sheet following a media path 540 between the sheet inlet and the sheet outlet. In this example, the driving mechanism comprises rollers 530 upstream and downstream from the print head or print engine 590, the upstream direction and downstream directions corresponding to the media path 540 running from the sheet inlet to the sheet outlet, upstream corresponding to closer to the sheet inlet, downstream corresponding to closer to the sheet outlet. In this specific example, ordered from upstream to downstream, the media path follows the following order being the sheet inlet, a first portion of the driving mechanism, the print head or print engine, a second portion of the driving mechanism, a U turn corresponding to the scanner, and the sheet outlet equipped with the spring loaded member acting as a flexible and resilient device according to this disclosure. It should be noted that numerous other configurations may be considered. In particular, example printers may comprise components or elements as per any of the example sheet transport apparatuses hereby described, including combinations of components or elements of such example sheet transport apparatuses.

Example spring loaded member 550 comprises a compression spring having a spring rate of about 0.75 N/mm, the compression spring having a compression spring axis generally parallel to a direction D1 of the media path at the sheet outlet, the spring loaded member sliding back and forth below the upper wall or ceiling of the sheet outlet as the spring is compressed and decompressed by the force of a sheet exiting through the sheet outlet and in contact with the spring loaded member, for example due to such sheet curling up against gravity towards the upper wall. In some examples, the back and forth sliding may have a maximum amplitude of less than 15 cm. In some examples, the back and forth sliding may have a maximum amplitude of less than 10 cm. In some examples, the back and forth sliding may have a maximum amplitude of less than 6 cm. In some examples, the back and forth sliding may have a maximum amplitude of more than 5 cm. In some examples, the back and forth sliding may have a maximum amplitude of more than 1 cm.

One should note that an advantage of a resilient and flexible device or spring loaded member according to this disclosure is that such resilient and flexible device or spring loaded member may be configured to be permanently in place, thereby avoiding having to rely on an action from a user to reduce a risk of a sheet getting accidentally re-ingested.

Figure 5B:
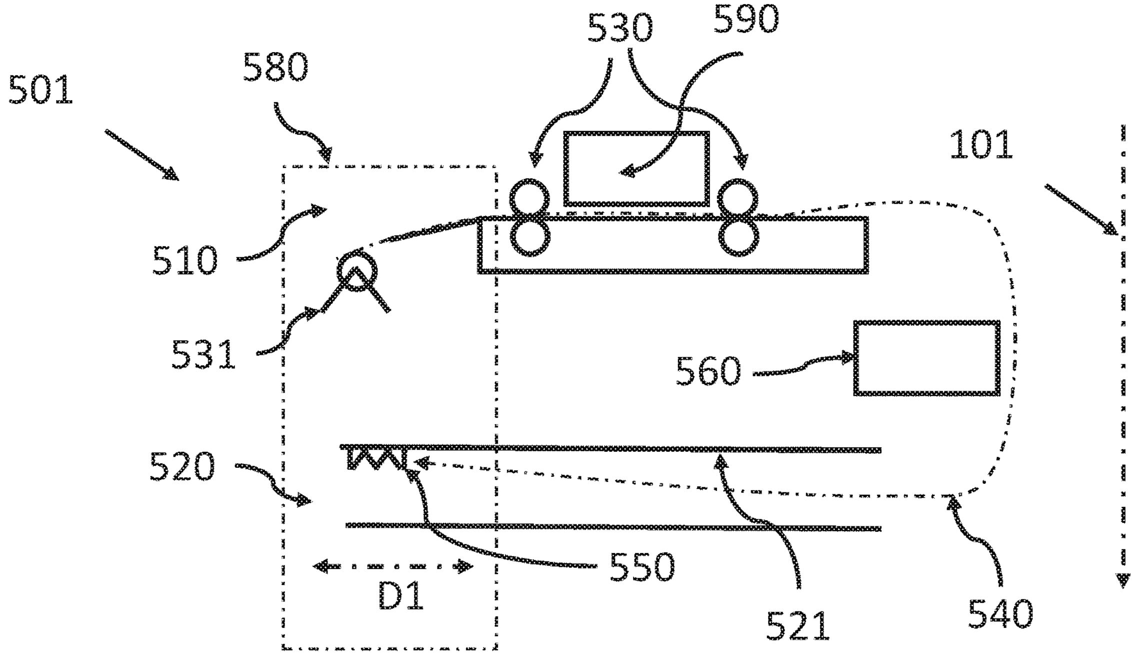
FIG. 5B illustrates a second example printer.

FIG. 5B illustrates an example printer 501. Example printer 501 comprises the elements or components described in the context of example printer 500, which are numbered in the same manner. Printer 501 further comprises a roll holder 531 located on the first side of the printer. The roll holder should be understood as a mechanical structure configured to hold a roll of media in sheet form. The rolled sheet may be fed from the roll to the sheet inlet. Combining the sheet inlet, sheet outlet and roll holder on the first side permits facilitating the printer operation for a user, and the placement of the printer in a room, avoiding having to move around the printer to feed and collect the sheet. Such a configuration corresponding to the storing of a sheet in a roll is prone to sheet curling, and therefore particularly suited to a configuration as per this disclosure.

In some examples, the sheet may be provided as a continuous sheet, in other words a flexible and planar printing media provided rolled in a roll in order to be placed on a printer spindle or roll holder. A continuous sheet may have a width along a direction parallel to a longitudinal axis of the roll, and a length along a direction perpendicular to the width. In some examples, the length of the continuous sheet is at least 20 times longer than the width of the continuous sheet when the roll of continuous sheet is provided. In some examples, the length is at least 40 times longer than the width when the roll of continuous sheet is provided. In some examples, the length is at least 60 times longer than the width when the roll of continuous sheet is provided. A continuous sheet may be cut by a printer cutter downstream from a print zone when a corresponding print job has been completed.

The configuration of example printer 501 may facilitate handling of printing media. Manual manipulation of a printing substrate may result awkward or lead to damaging the substrate, particularly in the case of large format printers using a large format printing substrate or printing media, for example ANSI (American National Standards Institute) A (229 mm×305 mm), B (305 mm×457 mm), C (457 mm×610 mm), D (610 mm×914 mm) or E (914 mm×1219 mm) cut sheets formats, or continuous sheet rolls such as, for example, 90-meter-long E size paper which may weigh up to 8 kg. The subject of the present disclosure relates to providing such a printing capability in an automated manner, reducing or suppressing manual intervention, and doing so while limiting or reducing a number and cost of mechanical elements providing such automated capability.

Figure 6:
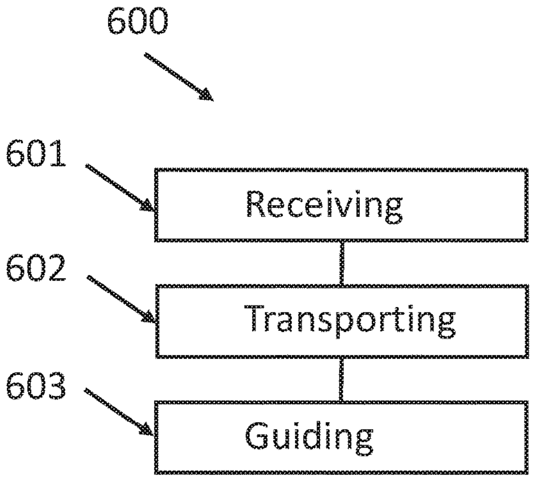
FIG. 6 illustrates a first example method.

FIG. 6 illustrates and example method 600 to transport a sheet. Example method 600 may be used in conjunction with any example sheet transport apparatus or printer as described hereby. In block 601, method 600 comprises receiving, at a sheet inlet, a sheet of media along a first direction. Block 601 thereby corresponds to the feeding of a sheet into a sheet transport apparatus along the first direction. In some examples, the first direction is perpendicular to a leading edge of the sheet, and perpendicular both to a width and a thickness direction of such sheet, such first direction corresponding to a length direction of such sheet. In some examples, the first direction makes an angle of between 60 and 120 degrees with the direction of gravity. In some examples, the first direction makes an angle of between 70 and 110 degrees with the direction of gravity. In some examples, the first direction makes an angle of between 80 and 100 degrees with the direction of gravity. In some examples, the first direction makes an angle of between 85 and 95 degrees with the direction of gravity.

Example method 600 comprises, in block 602, transporting, by a sheet driving mechanism, the sheet on a media path from the sheet inlet to a sheet outlet, the sheet exiting the sheet outlet along a direction opposite to the first direction and under the sheet inlet. As explained in the context of the example sheet transport apparatuses and example printers hereby described, such a configuration permits both benefiting from the contribution of the force of gravity when transporting the sheet from the inlet to the outlet, and facilitating access to a user to both inlet and outlet by locating both the inlet and outlet on a same side. The direction is opposite to the first direction in some examples when making an angle of between +30 and −30 degrees with the first direction. The direction is opposite to the first direction in some examples when making an angle of between +20 and −20 degrees with the first direction. The direction is opposite to the first direction in some examples when making an angle of between +10 and −10 degrees with the first direction. The direction is opposite to the first direction in some examples when making an angle of between +5 and −5 degrees with the first direction. While the first direction and the opposite direction may be considered as generally parallel, they are opposite in that a sheet passing through the inlet will pass in the first direction opposite to a sheet passing in the opposite direction through the outlet in an in/out movement taking place on a same side.

Example method 600 comprises, in block 603, guiding the exiting sheet away from the sheet inlet by applying a guiding force on the exiting sheet with a flexible and resilient device partially obstructing the sheet outlet. As explained in the context of example sheet transport apparatuses or example printers, the flexible and resilient device, which may be a spring loaded member, will permit avoiding that a sheet exiting through the sheet outlet would curl up and get accidentally re-ingested through the sheet inlet to get accidentally re-transported and re-processed. Such process permits avoiding re-ingestion while preventing any significant obstruction of either of the sheet inlet or sheet outlet which may otherwise increase a risk of jamming.

Figure 7:
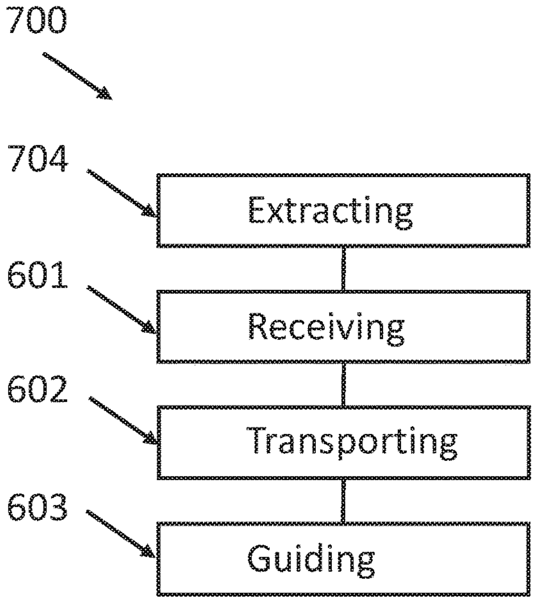
FIG. 7 illustrates a second example method.

FIG. 7 illustrates an example method 700. Example method 700 comprises blocks 601-603 as described in the context of method 600. Example method 700 further comprises block 704 of extracting the sheet of media received at the sheet inlet from a roll. Such a method 700 may for example be executed using a printer such as example printer 501. In some examples, a sheet curbing direction induced by the roll leads the sheet to curb against gravity when reaching the sheet outlet, whereby the method according to this example is particularly suited. Indeed, in some examples, the guiding force counters a curling force generated by a storage of the sheet in the form of a roll.

Figure 8:
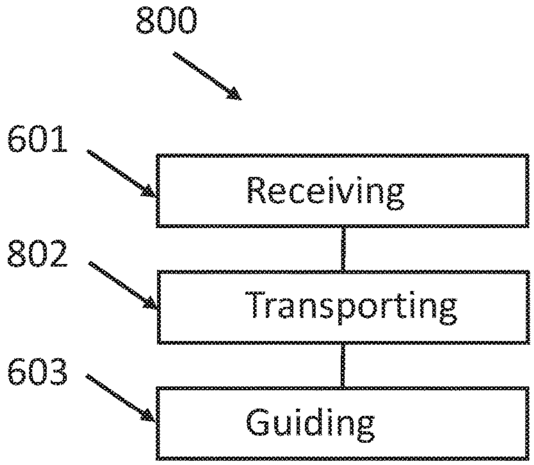
FIG. 8 illustrates a third example method.

FIG. 8 illustrates an example method 800. Example method 800 comprises blocks 601 and 603 as described in the context of method 600. Example method further comprises block 802 which comprises the transporting action described in the context of block 602, whereby the transporting of the sheet through the sheet inlet and the sheet outlet takes place simultaneously. Such a situation may for example take place in the case of a sheet having a length longer than the media path of the apparatus or printer, whereby a leading edge of the sheet has exited the sheet outlet while a section of the same sheet is still transported by the sheet driving mechanism through the sheet inlet. In some examples, such a sheet is stored in roll form prior to being received at the sheet inlet. Such a configuration is particularly prone to the leading edge being accidentally re-ingested or re-received at the sheet inlet due to curling, the configuration hereby described being particularly suited. One should note that in another example (not illustrated), such method 800 may comprise a further block such as block 704 of extracting according to example method 700.

Figure 9:
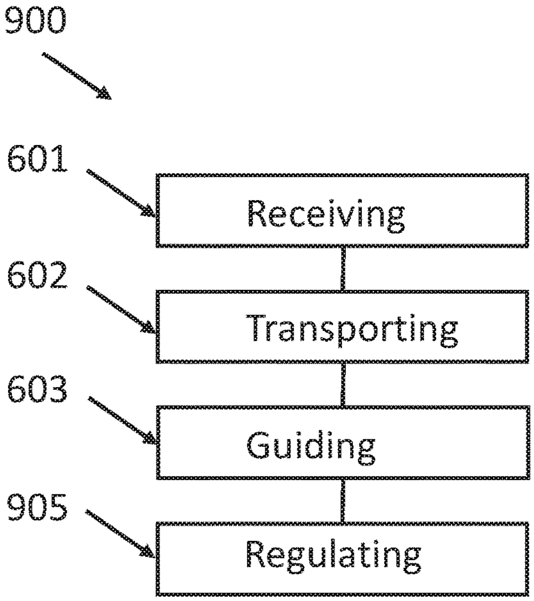
FIG. 9 illustrates a fourth example method.

FIG. 9 illustrates an example method 900. Example method 900 comprises blocks 601-603 as described in the context of method 600. Example method further comprises block 905 of regulating the guiding force as a function of a position of the flexible and resilient device along the first direction. Such a situation permits adapting the amount of the guiding force in reaction to a curling force of a sheet exiting through the sheet output. A strong curling force may correspond to a relatively large displacement of the flexible and resilient device, resulting in a stronger guiding force being applied back to the sheet, in order to balance the curling force and guide the sheet downwards in lieu of upwards. One should note that in other examples (not illustrated), such method 900 may comprise one or more further blocks such as blocks 704 or 802. In some examples, the guiding force increases linearly as the amount of displacement of the flexible and resilient device along the first direction increases. In some examples, the flexible and resilient device comprises a spring which has a spring rate of less than 1 N/mm, whereby a deformation, being either a compression or an extension, of the spring, will increase a corresponding force in line with the spring rate.

What is claimed is:

1. A sheet transport apparatus comprising:
a sheet inlet facing a specific side of the apparatus;
a sheet outlet facing the specific side of the apparatus and located below the sheet inlet, the sheet outlet comprising a ceiling between the sheet outlet and the sheet inlet;
a sheet driving mechanism configured for driving a sheet of media on a media path from the sheet inlet to the sheet outlet; and
a flexible and resilient device connected to the ceiling and partially obstructing the sheet outlet, whereby the flexible and resilient device comprises a spring, and wherein the spring, having a compression axis substantially parallel to a direction of the sheet of media at the sheet outlet, is capable of contacting the sheet of media.

2. The apparatus according to claim 1, whereby the spring has a spring rate of less than 1 N/mm.

3. The apparatus according to claim 1, whereby the spring is an extension spring having a stretching axis along a direction aligned with a direction of the media path at the sheet outlet.

4. The apparatus according to claim 1, whereby the flexible and resilient device obstructs an area covering less than 5% of a cross section of the sheet outlet.

5. The apparatus according to claim 1, whereby each of the sheet inlet and the sheet outlet span at least 250 mm along a direction perpendicular to both a direction of gravity and a direction aligned with a direction of the media path at the sheet inlet and at the sheet outlet, respectively.

6. The apparatus according to claim 1, the apparatus further comprising a scanner located along the media path.

7. The apparatus according to claim 1, the apparatus comprising: a guiding element in the media path, whereby the guiding element forms a U turn between the sheet inlet and the sheet outlet.

8. A printer comprising:
a scanner;
a sheet inlet for the scanner, the sheet inlet located on a first side of the printer;
a sheet outlet for the scanner, the sheet outlet located on the first side of the printer, the sheet inlet being located above the sheet outlet;
a sheet driving mechanism; and
a spring loaded member attached to an upper wall of the sheet outlet, wherein the spring loaded member, having a compression axis substantially parallel to a direction of the sheet of media at the sheet outlet, is capable of contacting a sheet of media.

9. The printer according to claim 8, the printer comprising: a roll holder located on the first side of the printer.

10. A method to transport a sheet, the method comprising:
receiving, at a sheet inlet, a sheet of media along a first direction;
transporting, by a sheet driving mechanism, the sheet on a media path from the sheet inlet to a sheet outlet, the sheet exiting the sheet outlet along a direction opposite to the first direction and under the sheet inlet; and
guiding the exiting sheet away from the sheet inlet by applying a guiding force on the exiting sheet with a flexible and resilient device partially obstructing the sheet outlet, whereby the flexible and resilient device comprises a spring, and wherein the spring, having a compression axis substantially parallel to a direction of the sheet of media at the sheet outlet, is capable of contacting the sheet.

11. The method according to claim 10, the method further comprising: extracting the sheet of media received at the sheet inlet from a roll.

12. The method according to claim 10, whereby the guiding force counters a curling force generated by a storage of the sheet in the form of a roll.

13. The method according to claim 10, the method further comprising: simultaneously transporting the sheet through the sheet inlet and through the sheet outlet.

14. The method according to claim 10, further comprising: regulating the guiding force as a function of a position of the flexible and resilient device along the first direction.

* * * * *